UNITED STATES PATENT OFFICE.

ELLEN KEARNEY, OF NEW YORK, N. Y.

HAIR-TONIC.

No. 924,359.

Specification of Letters Patent.

Patented June 8, 1909.

Application filed November 18, 1904. Serial No. 233,358.

*To all whom it may concern:*

Be it known that I, ELLEN KEARNEY, a resident of New York city, N. Y., postal address 132 West Seventieth street, have invented a certain new and useful composition—to wit, a Hair-Tonic, Medicament, and Stimulant, of which the following is a specification.

The best proportions in the carrying out of the invention and the best manner of making the same, are as follows: Take one pound of leather salt-tanned with the hair on, preferably from the sides of the animal; or as a less preferable substitute take the skin before tanning, and soak it in alcohol, preferably ethyl alcohol at atmospheric temperature, for half an hour. The leather or skin should preferably be cut into small pieces, otherwise a longer soaking would be required. Then take the leather or skin and use it as follows:
Take one pound of the leather or skin when it has dried and digest it in one quart of alcohol in a double boiler or over a water bath, or with any other precautions so as not to boil off the alcohol and so as not to lose the alcohol by too rapid ebullition. After one hour pour off the alcohol, which should amount to about a pint and a half owing to the inevitable loss during the boiling. Also digest five ounces of dry Roman camomile flowers in two quarts of alcohol for the same length of time, and then pour off the extract. Mix the leather or skin extract with the camomile extract, which will make somewhat over two quarts, and add five ounces of glycerin, fifteen ounces of tincture of cantharides, and four quarts of alcohol and oil of verbena or other perfume to suit individual taste. Or in lieu thereof, digest the leather or skin and the Roman camomile flowers together in two quarts of alcohol for one hour, and then add five ounces of glycerin, fifteen ounces of tincture of cantharides, five quarts of alcohol, and oil of verbena or other perfume to suit the individual taste.
This composition produces remarkably efficaceous results in stimulating the scalp and hair, eliminating dandruff and improving the texture of the hair.

Some constituents have undoubtedly been extracted from the leather or skin, though as to the nature of these bodies I am uncertain.

I am unable to state to what proportions and to what extent the hoofs or other fibrous parts of the animal may be used instead of the skin or leather.

Camomile flowers, though an important constituent of the tonic, may in some instances be omitted with a slight impairment of the efficacy of the tonic, and I desire to include such a variation of the composition.

The tonic is to be applied in quantities sufficient to wet the scalp and should be rubbed into the scalp with only very gentle friction, especially if the hair is loose or falling; or it may be put on with a soft camel's hair brush. After two weeks when the falling out has ceased, less care and gentleness is required.

What I desire to claim however without limiting myself to the particular portions I have named and without meaning to exclude equivalents, is the following:

1. A hair tonic comprising an alcoholic extract of animal skin, alcoholic extract of camomile flowers, glycerin and tincture of cantharides.

2. A hair tonic comprising an alcoholic extract of animal skin, extract of camomile flowers, glycerin and tincture of cantharides.

3. A hair tonic comprising essentially an alcoholic extract of animal skin, glycerin and tincture of cantharides.

In testimony whereof I have signed this specification in the presence of two subscribing witnesses.

ELLEN KEARNEY.

Witnesses:
 A. L. O'BRIEN,
 E. VAN ZANDT.